United States Patent
Haefele et al.

(10) Patent No.: US 10,840,729 B2
(45) Date of Patent: Nov. 17, 2020

(54) METHOD AND SYSTEM FOR OPERATING A DC-DC CONVERTER OF AN ELECTRICAL SYSTEM TO DISTRIBUTE A LOAD

(71) Applicant: Robert Bosch GmbH, Stuttgart (DE)

(72) Inventors: Frank Haefele, Sachsenheim-Kleinsachsenheim (DE); Gholamabas Esteghlal, Stuttgart-Weilimdorf (DE); Markus Kretschmer, Pleidelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 100 days.

(21) Appl. No.: 15/746,984

(22) PCT Filed: Jun. 14, 2016

(86) PCT No.: PCT/EP2016/063629
§ 371 (c)(1),
(2) Date: Jan. 23, 2018

(87) PCT Pub. No.: WO2017/016738
PCT Pub. Date: Feb. 2, 2017

(65) Prior Publication Data
US 2018/0212457 A1   Jul. 26, 2018

(30) Foreign Application Priority Data

Jul. 28, 2015   (DE) .......................... 10 2015 214 221

(51) Int. Cl.
*H02J 7/14*   (2006.01)
*B60R 16/03*   (2006.01)
(Continued)

(52) U.S. Cl.
CPC ............ *H02J 7/1423* (2013.01); *B60R 16/03* (2013.01); *H02M 3/1584* (2013.01);
(Continued)

(58) Field of Classification Search
CPC .... H02J 7/1423; H02M 3/285; H02M 3/1584; H02M 2001/0019; H02M 2001/0009;
(Continued)

(56) References Cited

U.S. PATENT DOCUMENTS

2004/0041473 A1   3/2004   Deguchi
2013/0325197 A1*  12/2013   Mansfield ................. H02J 3/32
                                                              700/291

FOREIGN PATENT DOCUMENTS

CN   101933401 A   12/2010
CN   102237783 A   11/2011
(Continued)

OTHER PUBLICATIONS

International Search Report for Application No. PCT/EP2016/063629 dated Sep. 16, 2016 (English Translation, 3 pages).

*Primary Examiner* — Drew A Dunn
*Assistant Examiner* — Sailesh Thapa
(74) *Attorney, Agent, or Firm* — Michael Best & Friedrich LLP

(57) ABSTRACT

The invention relates to a method for operating an electrical system (1) having a high-voltage section (2) and a low-voltage section (3) which are electrically connected to one another by means of a DC-DC converter (4), wherein the low-voltage section (3) has at least one rechargeable energy store (8) and at least one electrical consumer (9), wherein the DC-DC converter (4) is operated on the basis of an electrical load (P) acting on the low-voltage section (3). In order to determine the load (P), provision is made for all currents flowing through the DC-DC converter (4) to be recorded and added to one another.

9 Claims, 4 Drawing Sheets

(51) Int. Cl.
*H02M 3/158* (2006.01)
*H02M 3/28* (2006.01)
*H02M 1/00* (2006.01)

(52) U.S. Cl.
CPC ......... *H02M 3/285* (2013.01); *B60L 2210/10* (2013.01); *B60L 2240/52* (2013.01); *B60L 2260/54* (2013.01); *H02M 2001/0009* (2013.01); *H02M 2001/0019* (2013.01); *Y02T 10/72* (2013.01)

(58) Field of Classification Search
CPC . B60R 16/03; Y02T 10/7216; B60L 2240/52; B60L 2210/10; B60L 2260/54
See application file for complete search history.

(56) References Cited

FOREIGN PATENT DOCUMENTS

| | | | | |
|---|---|---|---|---|
| CN | 103036428 | A | 4/2013 | |
| CN | 103714402 | A | 4/2014 | |
| DE | 102013001564 | | 8/2013 | |
| EP | 1143591 | | 10/2001 | |
| EP | 1143591 | A2 * | 10/2001 | ............. H02J 1/102 |
| EP | 1578010 | | 9/2005 | |
| JP | 11127573 | | 5/1999 | |

* cited by examiner

METHOD AND SYSTEM FOR OPERATING A DC-DC CONVERTER OF AN ELECTRICAL SYSTEM TO DISTRIBUTE A LOAD

BACKGROUND OF THE INVENTION

The invention relates to a method for operating an electrical system that has a high-voltage section and a low-voltage section that are electrically connected to one another by a DC-DC voltage converter, wherein the low-voltage section has at least one rechargeable energy store and at least one electrical consumer, and wherein the DC-DC voltage converter is operated on the basis of an electrical load acting on the low-voltage section.

In addition, the invention relates to an apparatus for operating the electrical system that has a controller that operates the DC-DC voltage converter on the basis of a load acting on the low-voltage section.

In addition, the invention relates to an electrical system having such an apparatus.

Electrical systems having DC-DC voltage converters for electrically connecting a low-voltage section to a high-voltage section are fundamentally known from the prior art. In this case, the DC-DC voltage converter generally operates as a voltage controller that regulates the voltage difference between the two sections. In this case, it is advantageous if the regulation is effected on the basis of an electrical load actually acting on the low-voltage section. To date, however, the load that is actually acting is not estimated or sensed. Instead, information from a superordinate entity that switches on or off a consumer loading the low-voltage section is used to actuate the DC-DC voltage converter.

SUMMARY OF THE INVENTION

The method according to the invention has the advantage that the recourse to information from a superordinate entity can be dispensed with. Instead, a currently acting load is ascertained or estimated directly, specifically on the basis of data that are easy to capture. As a result, it is possible to dispense with an interchange of information with the superordinate entity, and the actuation of the DC-DC voltage converter can be performed precisely with knowledge of the ascertained load. To this end, the invention provides for the load to be determined by virtue of all the currents flowing through the DC-DC voltage converter being sensed and added. The load acting on the low-voltage section is therefore ascertained on the basis of the currents conducted by the DC-DC voltage converter. In this case, no distinction is drawn between consumers or energy generators or energy stores. If the rechargeable energy store is charged, for example, then it likewise draws power from the DC-DC voltage converter and in this respect is likewise a consumer. The load ascertained on the basis of the currents therefore does not correspond to the electrical and activated consumer that is really connected to the low-voltage section. This is not a disadvantage, however, because from the point of view of the DC-DC voltage converter the energy store likewise is the consumer, as already explained above. When multiple consumers are switched on, multiple partial loads are produced that act on the low-voltage section. These are understood together as a (total) load. The load is computed by adding the currents of the DC-DC voltage converter and multiplying by the output voltage of the DC-DC voltage converter. With knowledge of the (total) load ascertained in this way, it is then possible to actuate the DC-DC voltage converter in optimum fashion, for example in order to avoid voltage dips. In particular, there is provision for a distinction to be drawn between a base load (particularly more than one second elapsed after a consumer is switched on or off), an alternating load (particularly less than one second and more than one millisecond elapsed after a consumer is switched on or off) and a peak load (particularly less than one millisecond elapsed after a consumer is switched on or off).

According to a preferred development of the invention, there is provision for the base load to be determined by virtue of an output voltage of the DC-DC voltage converter being sensed. From the output voltage of the DC-DC voltage converter and the currents, it is possible to compute the base load.

To this end, there is particularly provision for the base load to be determined by virtue of the added currents as a total current being multiplied by the output voltage of the DC-DC voltage converter without alternating components. As a preference, the currents are converted for the low-voltage side if they are measured on the high voltage side. An adjustment for the high-voltage side is likewise conceivable, however, if the input voltage is measured instead of the output voltage of the DC-DC voltage converter. The base load is computed preferably by means of suitable filtering from the total load.

In addition, there is preferably provision for a peak load to be determined by virtue of a gradient of the added currents being ascertained. The peak load is computed from the gradient of the (total) current and the output voltage and a conversion factor. In this case, the computation preferably takes place in a very fast time frame of 100 μs, for example. On the basis of the gradient, a possible future electrical loading can be predicted and, even before this event occurs, an appropriate countermeasure can be initiated in order to counteract the event. If an excessively large positive or excessively large negative peak load is identified, the operation of the DC-DC voltage converter can be adapted by prescribing the setpoint voltage, for example.

As a particular preference, there is provision for the peak load to be compared with a prescribable limit value, and for measures to decrease the peak load to be initiated in the event of the limit value being exceeded.

In addition, there is preferably provision for the DC-DC voltage converter operated to be a multiphase converter having multiple DC-DC voltage converter modules. Hence, the DC-DC voltage converter is a scalable DC-DC voltage converter in which more or fewer DC-DC voltage converter modules are operated particularly on the basis of a required power. Particularly here is where advantages of the method according to the invention arise. In that case, if not all the DC-DC voltage converter modules of the multiphase converter are operated in a present normal mode and a critical peak load is sensed, connecting further DC-DC voltage converter modules allows the peak load to be distributed over all the activated DC-DC voltage converter modules. The advantageous determination of the load of the low-voltage section or of the low-voltage side therefore allows the multiphase converter to be operated such that a peak load is better distributed and, as a result, the life and loading of the DC-DC voltage converter are improved.

In addition, there is preferably provision for an alternating load to be determined by virtue of voltage changes in the low-voltage section being monitored. Sensing the voltage changes allows the switching on or switching off of consumers that are connected to the low-voltage section to be ascertained. With knowledge of the alternating load, it is therefore possible to adapt the operation of the DC-DC voltage converter to present changes in the operation of the low-voltage section.

The apparatus according to the invention is distinguished in that the controller is set up specifically to perform the method according to the invention. This results in the advantages already cited.

The electrical system according to the invention is distinguished by the apparatus according to the invention. This results in the advantages already cited.

BRIEF DESCRIPTION OF THE DRAWINGS

The invention shall be explained in more detail below with reference to the drawing, in which.

DETAILED DESCRIPTION

Figure 1:
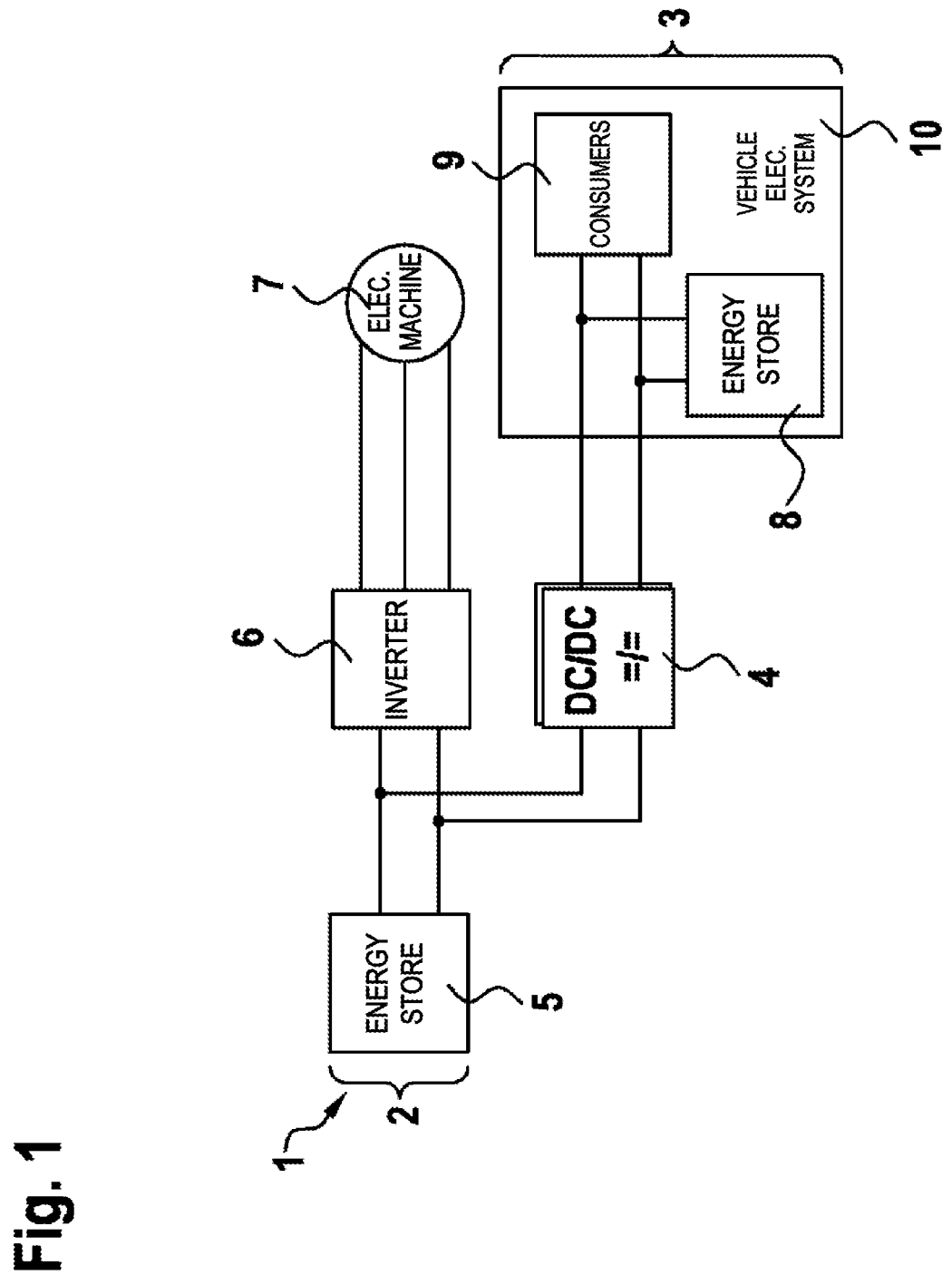
FIG. 1 shows a schematic depiction of an electrical system of a motor vehicle.

FIG. 1 shows a simplified depiction of an electrical system 1 of a motor vehicle, not depicted in more detail at this junction. The electrical system 1 has a high-voltage section 2 and a low-voltage section 3 that are electrically connected to one another by a DC-DC voltage converter configured as a multiphase converter 4. In the present case, the high-voltage section 2 comprises a rechargeable high-voltage energy store 5, an inverter 6 and an electrical machine 7 that is operated by the inverter 6. In this case, the electrical machine 7 can be operated by motor or by generator and is particularly configured as a drive machine of the motor vehicle. The low-voltage section 3 comprises a low-voltage energy store 8 that is likewise configured to be rechargeable, and also one or more consumers 9. Together, the energy store 8 and the consumers 9 form the vehicle electrical system 10 of the motor vehicle.

Figure 2:
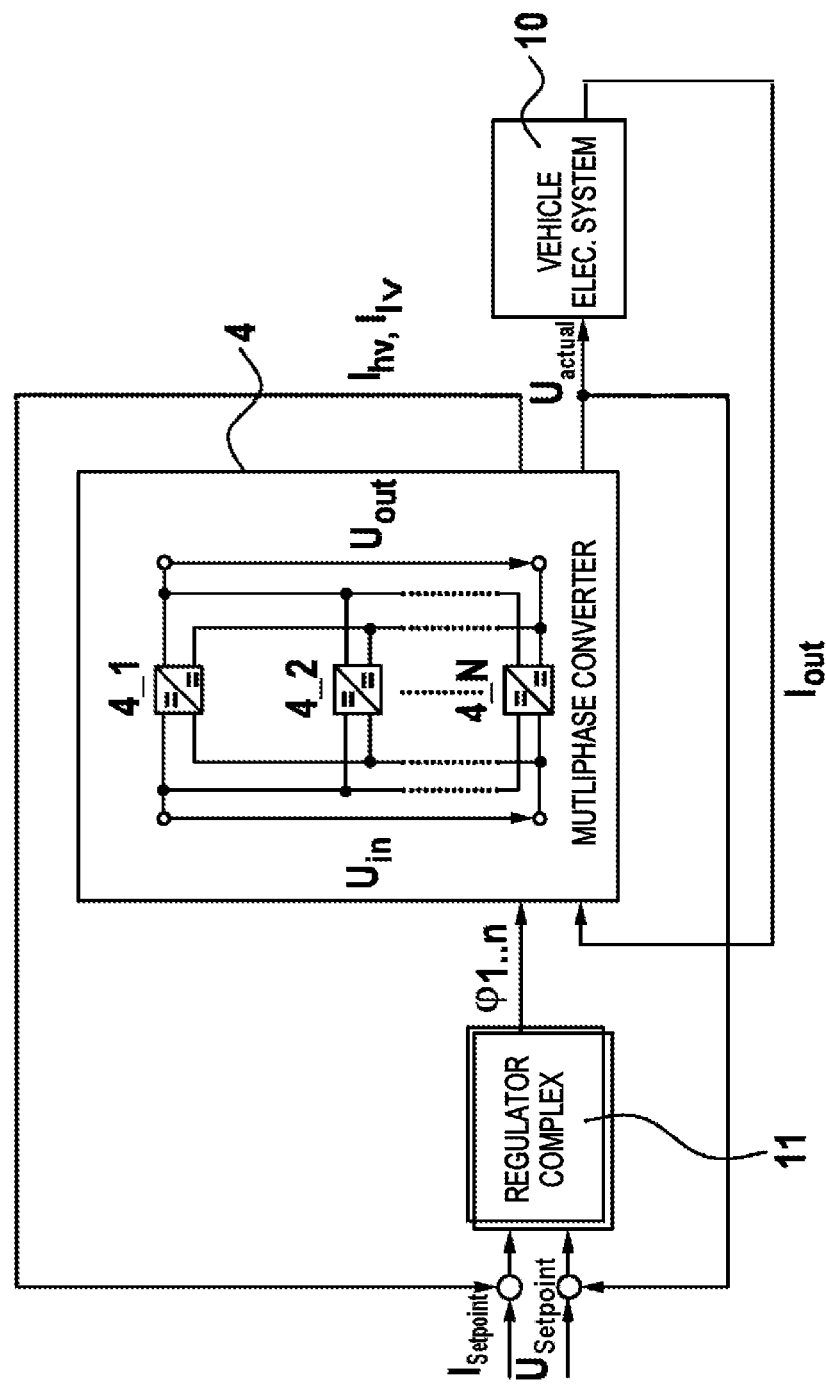
FIG. 2 shows a design of a control system for the electrical system.

FIG. 2 shows a further depiction of the electrical system 1 with a regulator complex 11, with the multiphase converter 4, which has N parallel-connected DC-DC voltage converter modules 4_1, 4_2, . . . , 4_N. The multiphase converter 4 has a high-voltage-section input voltage $U_{in}$ and a low-voltage-section output voltage $U_{out}$, which arises from the parallel connection and the operation of the DC-DC voltage converter modules 4_1, 4_2 to 4_N. Actuating the DC-DC voltage converter modules of the multiphase converter 4 results in an actual voltage $U_{actual}$ that is provided to the vehicle electrical system 10. The regulator complex 11 is supplied with a setpoint current $I_{setpoint}$ and with a setpoint voltage $U_{setpoint}$ and also with an actual current of the multiphase converter 4 on the high-voltage side $I_{hv}$ and the low-voltage side $I_{lv}$. Particularly this and the actual current $I_{out}$ result in the actuation of the multiphase converter 4.

Figure 3:
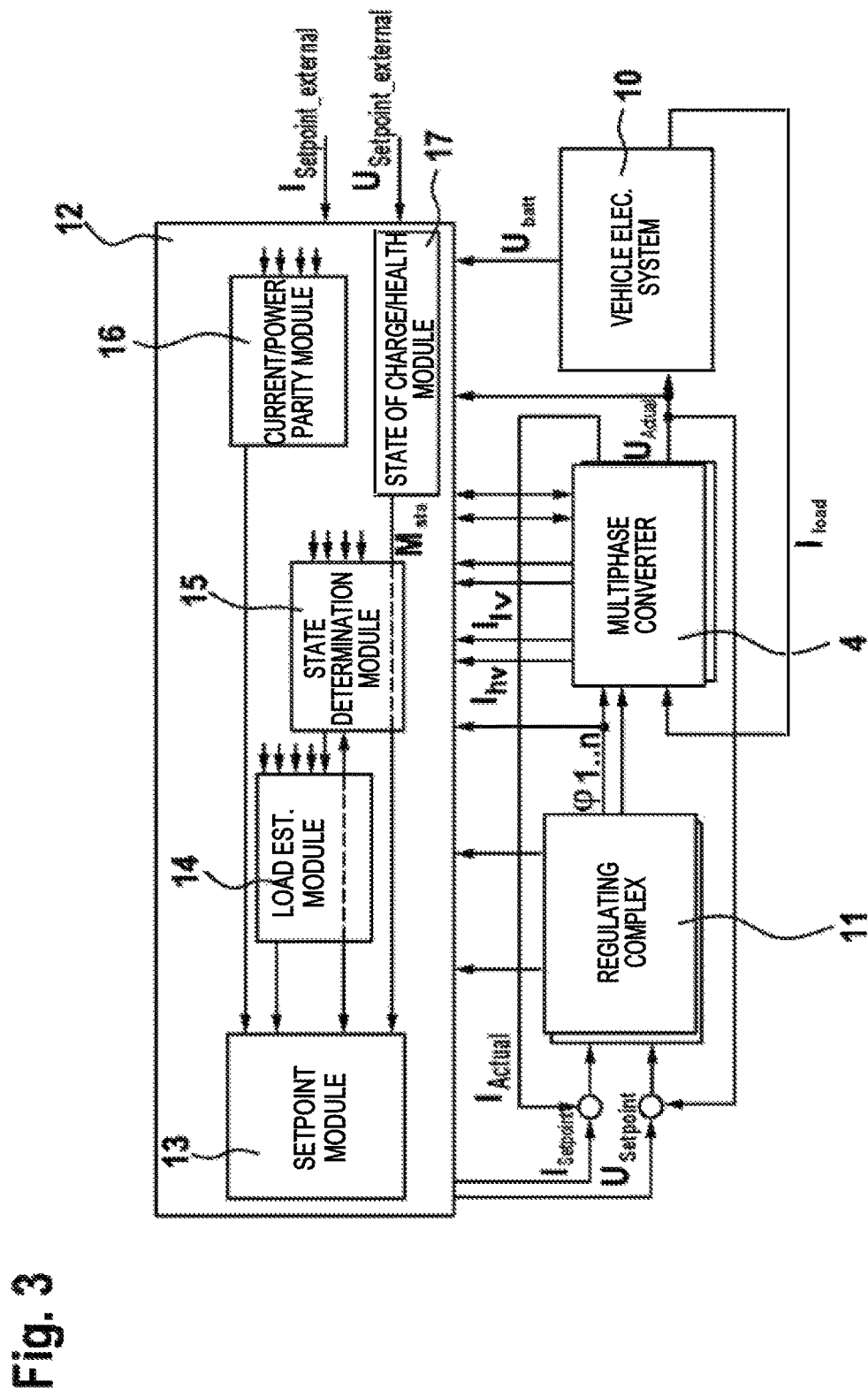
FIG. 3 shows a schematic depiction of an advantageous operating strategy module of the electrical system.

FIG. 3 shows a schematic depiction of an operating strategy entity that is configured as an operating strategy module 12 of a controller of the motor vehicle. The operating strategy module 12 takes a present operating point of the electrical system 1 as a basis for deciding how many DC-DC voltage converter modules 4_1, 4_2, . . . 4_N and what parts of a module, such as a step-down converter, for example, are meant to be active. The operating strategy entity receives, as state variable, the desired voltage in the output $U_{setpoint\_external}$, the present currents $I_{hv}$ and/or $I_{lv}$ on the low-voltage side and/or the high-voltage side for the mode of operation of the multiphase converter 4 (intermittent or uninterrupted operation), the voltage $U_{actual}$ currently measured at the output of the multiphase converter 4 and also internal controlled variables (pilot control, adaptations and control output signal of the regulator complex 11). Optionally, the operating strategy module 12 is moreover supplied with the setpoint current $I_{setpoint}$ as input value $I_{setpoint\_external}$ and also with a setpoint voltage $U_{setpoint\_external}$. It is thus possible for an external entity to prescribe a desired setpoint current for one or more of the modules or DC-DC voltage converter modules 4_1, 4_2, . . . , 4_N. The output of the operating strategy entity provides not only the setpoint currents $I_{setpoint}$ and voltages $U_{setpoint}$ but also module states $M_{stat}$.

The operating strategy module 12 comprises a module 13 for determining setpoint values of the voltage, of the current and of the module states, a module 14 for load estimation, a module 15 for module state determination, a module 16 for current parity/power parity and a module 17 for ascertaining a state of charge or state of health of the low-voltage energy store 8.

In brief, the operating strategy entity therefore performs the following tasks:

Current parity/power parity: the modules can deliver different currents and/or powers for the same loading on the basis of the tolerance of the components. In order to prevent different loadings on the modules/DC-DC voltage converters, the same amount of current/amount of power is achieved by modifying the setpoint currents/setpoint powers for different modules.

Battery charging voltage estimation: if the charging voltage of the low-voltage energy store 8 is not available, it is estimated by the module 17.

Module state determination: present states of the modules are computed. Depending on the captured states, said modules are activated or deactivated. If a module is meant to be switched on or off not by regulator, but rather after a prescribed time or according to a prescribed dynamic, then this sub-function will switch on or off the relevant module or parts thereof.

Load estimation: depending on the measured currents and output signals of the regulating complex 11, the switched-on load that is present on the vehicle electrical system 10 is estimated.

Setpoint value determination: depending on the calculated setpoint currents, the load current, external setpoint voltage requirements, estimated charging voltage and optionally external setpoint current requirement, the setpoint currents, voltages and setpoint module states are determined and provided to regulators or hardware drivers of the multiphase converter 4.

The operating strategy entity or the operating strategy module 12 loads the DC-DC voltage converters of the multiphase converter 4 evenly, optimizes switching processes and increases the life of the electrical system 1 and of the multiphase converter 4.

If multiple DC-DC voltage converter modules 4_1, 4_2, . . . , 4_N are connected in parallel at the output, or in the case of resonant converters with multiple step-down converters (bucks) at the output, the different component tolerances mean that different currents can flow or different powers can be attained. This means that the components are loaded differently and thus age differently. In this case, the loading and aging of the components also is dependent on the electrical load of the low-voltage section 3 that acts on the DC-DC voltage converter modules 4_1, 4_2, . . . , 4_N. With knowledge of the load that is acting, it would therefore be possible to actuate the DC-DC voltage converter in optimized fashion.

Figure 4:
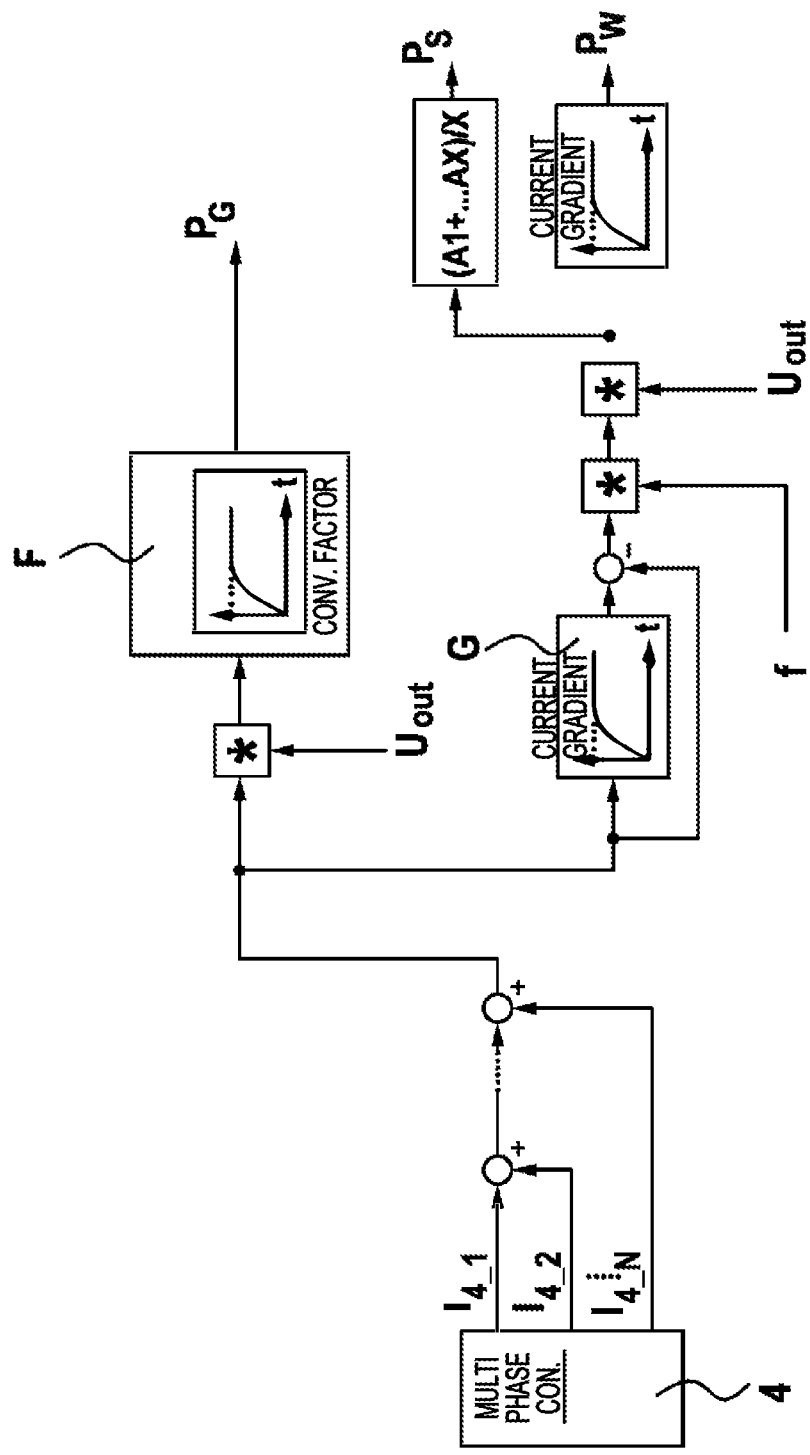
FIG. 4 shows a method for determining a load of the electrical system.

In this regard, FIG. 4 shows a simplified depiction of a method for determining a load P that acts on the low-voltage section 3. In this case, it is assumed that the load P is made up of a base load $P_G$, a peak load $P_S$ and an alternating load $P_W$. In order to determine the load P or the base load, the peak load and the alternating load, the procedure is as follows:

First of all, the currents $I_{4\_1}$, $I_{4\_2}$, . . . , $I_{4\_N}$ of the individual DC-DC voltage converter modules 4_1, 4_2, . . . , 4_N are added. To sense the currents, suitable sensors or circuits of the multiphase converter 4 can be used that may already be present anyway. As a result of the currents of the multiphase converter 4 being sensed and added, a distinction is not drawn between consumers 9 and energy store 8, which can also serve as an energy supplier. Thus, the ultimately ascertained load on the low-voltage section 3 corresponds not to the load on the switched-on energy consumer 9, but rather to the total load comprising consumer 9 and energy store 8. From the point of view of the multiphase converter 4, the energy store 8 is ultimately likewise a consumer, particularly when it is being charged, which means that this contemplation of the low-voltage section for determining the load is not a disadvantage.

To determine the base load $P_G$, the sum of the added currents is multiplied by the output voltage $U_{out}$, and the result is filtered using a suitable filter F. The method involves the currents I being converted for the low-voltage side of the multiphase converter 4 if they are measured on the high-voltage side. An adjustment for the high-voltage side is likewise possible if the input voltage $U_{in}$ of the multiphase converter 4 is measured. The filtering determines the base load from the total load computed in this manner.

The peak load $P_S$, which can only occur for a short time, is computed from the gradient of the sensed total current. First of all, the current gradient G is computed and is subsequently scaled using a suitable conversion factor f and multiplied by the output voltage $U_{out}$ of the multiphase converter 4. As a current change of 100 kA/s is permitted at this juncture, for example, the computation takes place in a very fast time frame, preferably of 100 μs. The described computation forecasts future peak load $P_S$, so that countermeasures can be initiated even before the occurrence of a possibly damaging event. If a peak load $P_S$ that is greater than the prescribable limit value is identified, for example, further DC-DC voltage converter modules 4_1, 4_2, . . . , 4_N can or must be connected so that the total current is distributed over multiple instances of these DC-DC voltage converter modules and the loading on a single DC-DC voltage converter module is decreased. In particular, there is provision in this case for the peak load $P_S$ to be determined by virtue of a mean value being formed that is obtained from (A1+ . . . AX)/X, A being a measured/computed value and X being the number of measured values.

The alternating load $P_W$ is determined by virtue of current changes in the low-voltage section 3 being sensed. In the present case, the alternating load is referred to when consumers 9 in the vehicle electrical system 10 are switched on or off. When the respective consumer 9 or the load linked thereto is switched on or off, a voltage change can occur in the vehicle electrical system 10. Such voltage changes are preferably avoided in order to avoid undesirable voltage fluctuations for controller or else for the energy store 8. Depending on the ascertained alternating load $P_W$, the actuation of the DC-DC voltage converter modules 4_1, 4_2, . . . , 4_N is therefore adapted in order to reduce or compensate for the voltage fluctuations brought about by the switching on or off.

The invention claimed is:

1. A method for operating a DC-DC voltage converter (4) of a motor vehicle electrical system (1), the motor vehicle electrical system including a high-voltage section (2) and a low-voltage section (3) that are electrically connected to one another by the DC-DC voltage converter (4), wherein the low-voltage section (3) has at least one rechargeable energy store (8) and at least one electrical consumer (9), wherein the DC-DC voltage converter (4) is operated on the basis of an electrical load (P) acting on the low-voltage section (3), characterized in that the load (P) is determined by virtue of all the currents flowing through the DC-DC voltage converter (4) being sensed and added to one another, a peak load ($P_S$) of the load (P) is forecast from a gradient of the added currents being ascertained and a present base load ($P_G$), and the peak load ($P_S$) is compared with a prescribable limit value in order to initiate measures to avoid the peak load ($P_S$) in the event of the limit value being exceeded, and wherein when a critical peak load is sensed, one or more additional DC-DC voltage converter modules are connected distributing the peak load over all of the DC-DC voltage converter modules.

2. The method as claimed in claim 1, characterized in that the base load ($P_G$) of the load (P) is determined by virtue of an output voltage of the DC-DC voltage converter (4) being sensed.

3. The method as claimed in claim 1, characterized in that an alternating load ($P_W$) of the load (P) is determined by virtue of voltage changes in the low-voltage section (3) being monitored.

4. The method as claimed in claim 1, characterized in that the DC-DC voltage converter (4) operated is a multiphase converter (4) having multiple parallel-connected DC-DC voltage converter modules (4_1, 4_2, . . . , 4_N).

5. An apparatus for operating a DC-DC voltage converter (4) of a motor vehicle electrical system (1), the motor vehicle electrical system including a high-voltage section (2) and a low-voltage section (3) that are electrically connected to one another by the DC-DC voltage converter (4), wherein the low-voltage section (3) has at least one rechargeable energy store (8) and at least one electrical consumer (9), having a controller that takes an electrical load acting on the low-voltage section as a basis for actuating the DC-DC voltage converter (4), characterized in that the controller is set up to operate the DC-DC voltage converter (4) on the basis of an electrical load (P) acting on the low-voltage section (3), wherein the load (P) is determined by virtue of all the currents flowing through the DC-DC voltage converter (4) being sensed and added to one another, a peak load ($P_S$) of the load (P) is forecast from a gradient of the added currents being ascertained and a present base load ($P_G$), and the peak load ($P_S$) is compared with a prescribable limit value in order to initiate measures to avoid the peak load ($P_S$) in the event of the limit value being exceeded, and wherein when a critical peak load is sensed, one or more additional DC-DC voltage converter modules are connected distributing the peak load over all of the DC-DC voltage converter modules.

6. The apparatus for operating an electrical system (1) as claimed in claim 5, characterized in that the base load ($P_G$) of the load (P) is determined by virtue of an output voltage of the DC-DC voltage converter (4) being sensed.

7. The apparatus for operating an electrical system (1) as claimed in claim 5, characterized in that the peak load ($P_S$) is compared with a prescribable limit value in order to initiate measures to avoid the peak load ($P_S$) in the event of the limit value being exceeded.

8. The apparatus for operating an electrical system (1) as claimed in claim 5, characterized in that an alternating load ($P_W$) of the load (P) is determined by virtue of voltage changes in the low-voltage section (3) being monitored.

9. The apparatus for operating an electrical system (1) as claimed in claim 5, characterized in that the DC-DC voltage converter (4) operated is a multiphase converter (4) having multiple parallel-connected DC-DC voltage converter modules (4_1, 4_2, . . . , 4_N).

* * * * *